A. W. HAMAKER.
FLY KILLING DEVICE.
APPLICATION FILED FEB. 25, 1913.
1,084,008.
Patented Jan. 13, 1914.
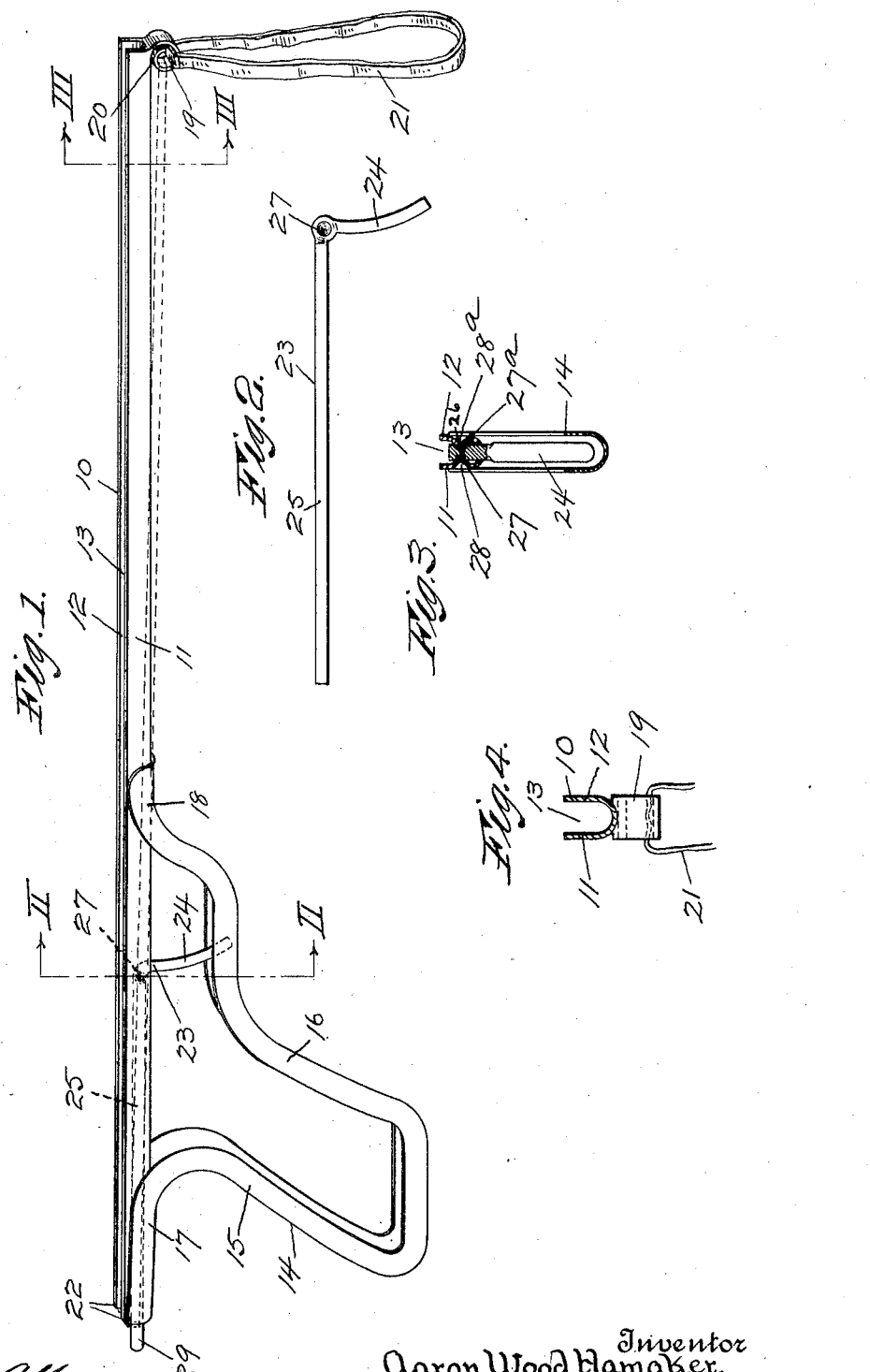
Witnesses:
Charles C. Abbe
M. Dumody
Inventor
Aaron Wood Hamaker.
By his Attorney
W. T. Criswell

UNITED STATES PATENT OFFICE.

AARON WOOD HAMAKER, OF NEW YORK, N. Y.

FLY-KILLING DEVICE.

1,084,008. Specification of Letters Patent. Patented Jan. 13, 1914.

Application filed February 25, 1913. Serial No. 750,564.

*To all whom it may concern:*

Be it known that I, AARON WOOD HAMAKER, a citizen of the United States, and a resident of New York, county and State of New York, have invented a certain new and useful Improvement in Fly-Killing Devices, of which the following is a full, clear, and exact specification.

This invention relates to a class of devices adapted to be used for destroying insects.

My invention has for its object primarily to provide a form of device designed to be utilized especially for encouraging the destruction of flies, or other insects by children, or adults in a manner to afford amusement by testing the skill of marksmanship of the operator of the device, and wherein is held to one end of a channel bar an elastic band which is stretched against its tension to the other end of the bar where it is retained so as to be released for striking the insect which will be killed by the force of the blow thereof.

Another object of the invention is to provide a substantially L-shaped lever which is fulcrumed to the channel bar so that one of its arms is movably disposed in the groove thereof and this arm has an end portion which extends some distance beyond the retaining end of the bar for releasing the elastic band when positioned on said retaining end.

A further object of the invention is to provide a fly killing device wherein a number of its parts may be stamped from sheet metal so as to be susceptible of being made to sell at a very moderate price, and which may be formed in various sizes and shapes.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a perspective view of one form of the fly killing device embodying my invention. Fig. 2 is a side view of the operating lever. Fig. 3 is a section taken on the line II—II of Fig. 1, and Fig. 4 is a section taken on the line III—III of Fig. 1.

The fly killing device has a channel bar 10 which is substantially U-shaped, as viewed in cross-section, whereby two spaced parallel flanges 11 and 12 are formed to extend upwardly to provide a longitudinal groove 13 therebetween for accommodating the long arm of a lever, as will be hereinafter more fully explained. Extending from the underside of one end portion of the channel bar 10 is a groove bracket 14 having a body, at 15, which is approximately the shape of an irregular U to provide two spaced arms 15 and 16 so that the bracket may be conveniently carried in the hand of a person for operating the device. The free end part of the arm 15 of the U-shaped body 13 of the bracket 14 is curved, at 17, in substantially an L-shape and is disposed laterally from this arm. The free end part of the arm 16 of the U-shaped body of the bracket is curved, at 18, in a manner so as to be disposed from the arm in an opposite lateral direction, and the curved parts 17 and 18 of the arms of the bracket are on the same relative plane.

Extending from the underside of the opposite end of the channel bar 10 is a retaining clip, or finger 19 which is integrally formed with the channel bar, and said finger, or clip is convoluted in a manner so that its free end portion is coiled inwardly and spaced from the other part of the finger, or clip to provide a mouth, or passage 20 for permitting an elastic band 21 to be inserted therethrough and removably held to the channel bar by the finger, or clip. By providing this form of the coiled finger, or clip 19, and disposing it under the end of the channel bar 11, as shown, it is also adapted to serve as a rest for allowing the device to be easily and noiselessly directed along the surface of a wall, or the top of a table, or the like to within striking distance of the fly, or insect to be destroyed as well as permitting the object to be accurately aimed at.

To operate the device it is charged by stretching the elastic band 21 against its tension to the other end of the channel bar 10 when it is removably disposed upon the retaining end, at 22, of the channel bar, and which is formed by making the flanges 11 and 12 thereof of a suitable depth.

Serving as means to release the elastic band 21 from the retaining end 22 of the channel bar so that it will rebound to strike the insect for killing it by the force of the blow, I provide a lever, as 23, which is preferably substantially L-shaped to provide two angularly disposed arms 24 and 25. The arm 24 of the L-shaped lever 23 is passed through an opening provided in the underside of the channel bar 10 so that the free end of this arm is disposed between the arms of the bracket 14 and the arm 25 will rest in the groove 13. The lever 23 is fulcrumed, at 26, to the channel bar 10 by providing center-punch indents 27 and 27ª in the sides of the lever at the juncture of its arms 24 and 25, and striking, as shown in Fig. 3, center-punch indents 28 and 28ª in the flanges 11 and 12 inwardly of the groove 13 so that the indents will be inserted in the indents 27 and 27ª. The arm 25 of the lever 23 is of sufficient length to provide an integral extension 29 which projects some distance beyond the retaining end 22 of the channel bar. As shown, the arm 25 of the lever is considerably longer than the arm 24, and is movably disposed in the groove 13 of the channel bar so as to be properly positioned for permitting the device to be quickly operated. When the elastic band 21 is disposed on the retaining end 22, and the arm 24 of the lever 23 is pulled in a direction toward the retaining end the arm 25 of said lever will be swung in an upward direction from the groove 13 for the extension 29 to release the elastic band 21 from the retaining end of the channel bar. The energy stored in the elastic band by being stretched longitudinally of the channel bar against its tension will when released cause it to contract and strike an object with great force within a distance of its normal length.

In order to permit the device to be made so as to be sold at a moderate price, I prefer to construct its principal parts of thin sheet metal, and preferably make the channel bar 10 and the bracket 14 in U-shaped forms, as viewed in cross-section, so as to give these elements the required strength and rigidity. By the use of suitable dies the channel bar 10 and the bracket 14 may be struck-out and formed into shape from a single strip of metal. By bending the strip at a point thereof which provides the retaining end 22 of the channel bar, and directing the bracket portion in the proper direction the underside of said bar will be disposed in the grooves of the curved ends 17 and 18 of the arms 15 and 16 of the bracket. The end of the curved part of the arm 15 will thereby be integrally formed with the retaining end 22 of the channel bar, and the free end of the curved part 18 of the arm 16 may be soldered, or otherwise secured to the channel bar.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof

Having thus described my invention, I claim as new and desire to secure by Letters Patent:—

1. A device of the character described, comprising a clip projecting from one end and disposed underneath a bar having a groove longitudinally in its upper surface, said clip removably carrying an elastic band and adapted to serve as a rest, and the opposite end of the groove bar serving as a retaining end for the elastic band when stretched so as to be disposed thereon, a substantially U-shaped handle extending from the underside of the groove bar, and a substantially L-shaped lever fulcrumed to the bar, one arm of said lever being disposed in the groove of the bar, and of sufficient length to extend beyond the retaining end of the bar so as to be adapted to release the elastic band when disposed on said retaining end, and the second arm of the lever being disposed through an opening in the grooved bar so as to be adapted when pulled to swing the first arm in a direction outwardly of the groove of the bar.

2. A device of the character described, comprising a U-shaped bar in cross-section and having one end serving as a retaining part, a clip projecting from the other end of the bar and disposed underneath said bar to serve as a rest, said clip having a mouth whereby an elastic band may be removably inserted in the clip and carried thereby, a substantially U-shaped bracket extending from the underside of the U-shaped bar at the end portion thereof which is opposite to the clip, and manually operative means serving to release the elastic band from the retaining part of the bar when disposed thereon.

3. A device of the character described, comprising a coiled finger projecting from one end and disposed underneath a bar U-shaped in cross-section, said finger removably carrying an elastic band, and adapted to serve as a rest, and the opposite end of the bar serving as a retaining end for the elastic band when stretched so as to be disposed thereon, a handle composed of two spaced arms extending from the underside of the bar, and a substantially L-shaped lever fulcrumed to the bar, one arm of said lever being disposed between the sides of the U-shaped bar, and of sufficient length to extend beyond the retaining end thereof so as to be adapted to release the elastic band when disposed on said retaining end, and the second arm of the lever being disposed through an opening in the bar so as to be adapted when pulled to swing the first arm in a direction outwardly of the sides of the bar.

4. A device of the character described, comprising a bar U-shaped in cross-section, and having one end serving as a retaining part, a coiled finger projecting from the other end of the bar and disposed underneath said bar to serve as a rest, said finger removably carrying an elastic band, a bracket composed of two spaced arms extending from the underside of the bar at the end portion thereof which is opposite to the finger, and manually operative means serving to release the elastic band from the retaining part of the bar when disposed thereon.

5. A device of the character described, comprising a bar having two upwardly projecting spaced flanges whereby a groove is provided longitudinally thereof, and one end of said bar serving as a retaining part, a substantially U-shaped bracket having a groove lengthwise thereof, said bracket extending from the end portion of the grooved bar adjacent to the retaining part thereof, a coiled finger projecting from the other end of the bar and disposed underneath, said finger removably carrying an elastic band, and manually operative means serving to release the elastic band from the retaining part of the bar when disposed thereon.

6. A device of the character described, comprising a metal bar having two upwardly projecting spaced flanges whereby a groove is provided longitudinally thereof, said bar having an opening therethrough, and one end of said bar serving as a retaining part, a substantially U-shaped metal bracket having a groove lengthwise thereof, and the free end portions of the arms of said bracket being curved in opposite lateral directions so as to permit the end portion of the bar adjacent the retaining part thereof to be seated and secured in the curved ends of the arms of the bracket, a coiled metal finger projecting from the other end of the grooved bar, and disposed underneath said bar to serve as a guide, said finger removably carrying an elastic band, a substantially L-shaped lever fulcrumed to the bar, one arm of said lever being disposed in the groove of the bar, and of sufficient length to extend beyond the retaining part thereof so as to be adapted to release the elastic band when disposed on the retaining part, and the second arm of the lever being disposed through the opening in the bar so as to be adapted when pulled to swing the first arm in a direction outwardly of the groove of the bar.

7. A device of the character described, comprising a metal bar having an opening therethrough and having two upwardly projecting spaced flanges whereby a groove is provided longitudinally thereof for accommodating an arm of a substantially L-shaped lever which has its other arm disposed through said opening of the bar, the lever being fulcrumed between the flanges of the bar, and one end of said flanged bar serving as a retaining part, a substantially U-shaped metal bracket having a groove lengthwise thereof, and the free end portions of the arms of said bracket being curved in opposite lateral directions so as to permit the end portion of the bar adjacent the retaining part thereof to be seated in the grooves of the curved ends of the arms of the bracket and secured thereto, and a coiled metal finger projecting from the other end of the grooved bar, and disposed underneath said bar to serve as a rest, said finger removably carrying an elastic band.

This specification signed and witnessed this twenty fourth day of February A. D. 1913.

AARON WOOD HAMAKER.

Witnesses:
 ROBT. B. ABBOTT,
 M. DERMODY.